US006817037B1

(12) United States Patent
King

(10) Patent No.: US 6,817,037 B1
(45) Date of Patent: Nov. 16, 2004

(54) STRETCHABLE ATHLETIC PANTS HAVING AN OVERLAPPING BONDED SEAM

(75) Inventor: Christopher John King, Broomfield, CO (US)

(73) Assignee: DashAmerica Inc., Broomfield, CO (US)

( * ) Notice: Subject to any disclaimer, the term of this patent is extended or adjusted under 35 U.S.C. 154(b) by 0 days.

(21) Appl. No.: 10/712,856

(22) Filed: Nov. 12, 2003

(51) Int. Cl.[7] .............................................. A41D 13/00
(52) U.S. Cl. ................................................. 2/275; 2/69
(58) Field of Search ............................. 2/275, 69, 228, 2/238, 227, 409, 405, 406, 267, 109, 73, 78.1–78.4, 79, 80, 83, 113, 114, 243.1, 214; 450/95–105; 156/93

(56) References Cited

U.S. PATENT DOCUMENTS

| | | | | |
|---|---|---|---|---|
| 1,706,461 A | * | 3/1929 | Oathout | 112/412 |
| 2,115,368 A | * | 4/1938 | Lustberg | 428/57 |
| 2,941,577 A | * | 6/1960 | Roseman | 156/274.4 |
| 3,026,225 A | * | 3/1962 | Ostby, Jr. | 428/57 |
| 4,593,418 A | * | 6/1986 | Simon | 2/275 |
| 4,604,152 A | * | 8/1986 | Liukko | 156/93 |
| 4,805,243 A | * | 2/1989 | Gibbens et al. | 2/228 |
| 4,961,233 A | * | 10/1990 | Black | 2/228 |
| 5,271,101 A | * | 12/1993 | Speth et al. | 2/228 |
| 5,919,539 A | * | 7/1999 | Bisbis et al. | 428/57 |
| 6,460,186 B1 | * | 10/2002 | Dailly | 2/109 |

* cited by examiner

Primary Examiner—Gloria M. Hale
(74) Attorney, Agent, or Firm—Holland & Hart LLP

(57) ABSTRACT

A pair of stretchable athletic pants comprising one or more panels attached together by one or more seams to form the pants in which at least one of the seams comprises an overlapping bonded seam is disclosed. The stretchable athletic pants, for example, may comprise one or more overlapping bonded seams and one or more other type of seam, such as a stitched seam. In one embodiment, for example, a plurality of overlapping seams are formed around the perimeter of the pants until only one seam remains to form the pants. In this embodiment, the final seam may be stitched or otherwise connected to complete the manufacture of the pants.

42 Claims, 3 Drawing Sheets

STRETCHABLE ATHLETIC PANTS HAVING AN OVERLAPPING BONDED SEAM

FIELD OF THE INVENTION

The present invention is related to stretchable athletic pants and, more particularly to stretchable athletic pants having an overlapping bonded seam.

BACKGROUND OF THE INVENTION

Stretchable athletic pants of various configurations have become popular because they provide durability, minimize chafing, and form-fitting comfort that minimizes drag and/or allows for easy layering of clothing. These stretchable athletic pants are often designed to be worn as a "base" layer directly adjacent to the skin of the wearer. Stretchable athletic pants often comprise one or more panels of stretchable material that are connected by one or more seams to form the garment.

Cycling pants, for example, typically provide durability, cushioning between a bicycle seat and a wearer, and minimize chafing of the body of the wearer. Cycling pants generally have a multiple panel construction, elastic ribbing around the leg and waist openings, and additional padding disposed in the crotch and buttocks regions of the cyclist (e.g., a chamois). The cycling pants are typically made from a plurality of stretchable fabric panels that are connected by seams.

SUMMARY OF THE INVENTION

The seams connecting one or more panels of stretchable athletic pants can irritate a wearer, such as by chafing or applying pressure to the wearer along a seam. In stretchable athletic pants where the seams come into direct contact with the skin of a wearer, for example, the irritation can be quite annoying where an athlete's repetitive movement moves the skin of the wearer relative to the seam of the stretchable athletic pants. Prior attempts to minimize this irritation include attempts to locate the seams in locations of the garments that are less likely to provide irritation to the wearer. Cycling pants, for example, typically comprise multiple panels of stretchable material connected at multiple seams to form the pants. Prior attempts to minimize irritation caused by the seams include attempts to locate the seams in locations of the cycling pants that would not interfere with pedaling motions of the wearer to provide less irritation to the wearer.

The present invention, however, provides stretchable athletic pants comprising one or more panels connected by at least one overlapping bonded seam formed at overlapping edges of the panel(s). In one embodiment, for example, the overlapping bonded seam provides a substantially flat seam that decreases the potential for irritating a wearer.

The stretchable athletic pants, for example, may comprise shorts, pants, tights, briefs, bibs or the like. In one particular embodiment, for example, a pair of cycling pants of the present invention comprises a plurality of panels connected by at least one overlapping bonded seam formed along overlapping edges of one or more panels.

The overlapping bonded seams of stretchable athletic pants of the present invention may comprise straight or curved seams. In one embodiment, for example, the overlapping bonded seam comprises a substantially flat seam when the stretchable athletic garment is formed. Where the overlapping bonded seam comprises a curved seam, for example, the curved seam may further comprise a minimum radius of curvature to provide a substantially flat seam when the stretchable athletic pants are formed.

DETAILED DESCRIPTION

Figures 1, 2:
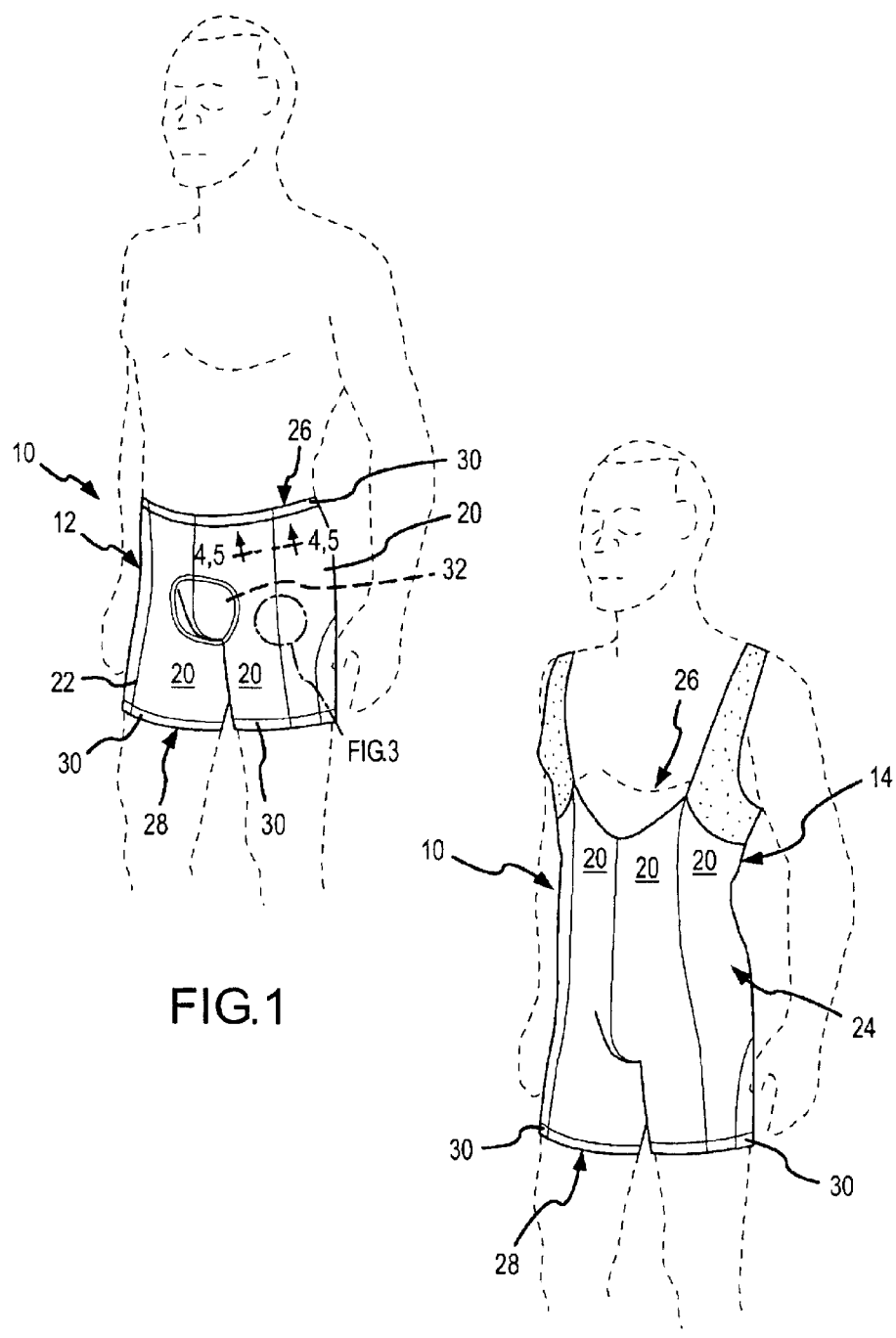
FIG. 1 shows a first embodiment of stretchable athletic pants of the present invention, wherein the stretchable athletic pants comprise a pair of cycling shorts.
FIG. 2 shows a second embodiment of stretchable athletic pants of the present invention, wherein the stretchable athletic pants comprise an athletic bib.

Stretchable athletic pants may include many configurations in which one or more panels are connected by one or more seams. Various embodiments of stretchable athletic pants are shown in FIGS. 1 and 2. These embodiments are merely exemplary of stretchable athletic pants contemplated within the scope of the present invention. Stretchable athletic pants, for example, may comprise shorts, pants, tights, briefs, bibs or the like. In one particular embodiment, for example, a pair of stretchable athletic shorts of the present invention comprises one or more panels connected by at least one overlapping bonded seam formed at overlapping edges of one or more panels.

FIG. 1, for example, shows an embodiment of stretchable athletic pants 10 comprising a pair of cycling shorts 12, and FIG. 2 shows an embodiment comprising a cycling bib 14. The cycling shorts 12 and/or cycling bib 14, for example, may also include varying length leg portions and/or torso portions. Leg portions of cycling shorts 12, for example, may extend anywhere from a brief design to full-length pants. The torso portion of the bib may comprise a tank top as shown in FIG. 2 or may comprise a shirt such as a short sleeve or long sleeve shirt.

The stretchable athletic pants 10, shown in FIGS. 1 and 2, comprise a plurality of panels 20 attached together by seams 22 to form the pants 10. The pants 10 further comprise a body portion 24, a waist opening 26 and a pair of leg openings 28. The cycling shorts 12, for example, may include elasticized hems 30 at the waist and/or leg openings 26 and 28 to ensure a proper fit and to prevent the legs from riding upward while cycling. In one embodiment, for example, a 2.5 centimeter wide gripper elastic forms the bottom leg hem and the waistband of the cycling shorts 12.

The body portion 24 is formed of a plurality of panels 20 connected at seams 22. In the embodiments shown in FIGS. 1 and 2, the seams 22 comprise structural seams without which at least a portion (e.g., a leg) of the pants would come apart. Thus, the structural integrity of the pants depends upon the structural seam. A structural seam typically undergoes more stress than a non-structural seam (e.g., a seam holding a panel of material, such as a vent or ornamental panel of material, in place).

While a plurality of panels 20 are shown in FIGS. 1 and 2, a single panel may be connected to itself along a single seam to form stretchable athletic pants within the scope of the present invention. The individual panels 20 are preferably formed of an elastic material such as a nylon and spandex blend or a nylon, polyester and spandex blend that provide a comfortable and conforming fit. As used in the context of the present invention, the term "elastic" refers to the properties of resisting deformation by stretching and being capable of substantially recovering its size and shape after deformation by stretching. The panels 20 may also comprise a wicking material that transports moisture away from the skin of a wearer. For example, one or more panels may comprise a multi-layered denier gradient structure such as described in U.S. Pat. No. 4,733,546 issued to Kazuhiro Toda on Mar. 29, 1988.

The stretchable athletic pants 10 may also optionally comprise an inner pad or "chamois" 32 located within the crotch and buttocks area of the pants to provide cushioning between a seat, such as a bicycle seat, and the wearer. The chamois 32 may comprise any chamois known in the art. One chamois that may be used in the cycling pants of the present invention and a method of manufacturing that chamois is disclosed in U.S. Pat. No. 6,565,702 entitled "Chamois for Cycling Pants and Method of Making" and issued to Robbin Douglas Forsyth and Jonathan Robert Knoll on May 20, 2003, which is incorporated by reference in its entirety into this application.

Figure 3:
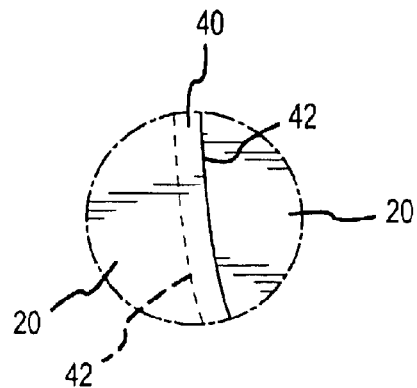
FIG. 3 shows an enlarged region of the cycling shorts shown in FIG. 1 including an overlapping seam.

FIG. 3 shows an enlarged region of the cycling shorts 12 of FIG. 1 showing an external view of an overlapping seam 40. The overlapping seam 40 is formed at overlapping ends of panels 20. The panels are preferably cut cleanly to provide smooth even surfaces that do not fray since the edges 42 of the panels may be exposed on the interior and exterior of the overlapping seam 40. In one embodiment, for example, the panels are cut one at a time using a laser cutter to provide clean cuts and to prevent the edges 42 of the panel from fraying.

Figure 4:
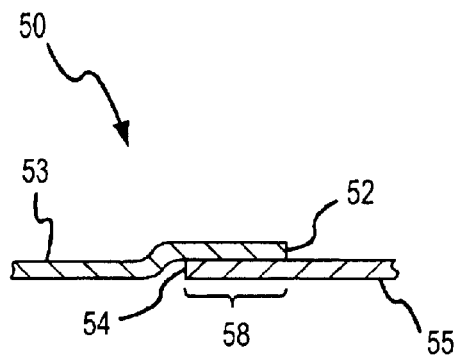
FIG. 4 shows a cross-sectional view taken along section line 4—4 of FIG. 1 and showing a first embodiment of an overlapping seam.

FIG. 4 shows a cross-section of a first embodiment of an overlapping seam 50. The overlapping seam 50 comprises an edge 52 of a first panel 53 overlapping an edge 54 of a second panel 55 to form an overlapping region 58. In this embodiment, the panels 53 and 55 are bonded directly together in at least a portion of the overlapping region 68 to form the overlapping seam 50. As used for the present invention, the term "bond" comprises fusing, welding, bonding using adhesives or heat-meltable plastics or any other type of bonding known in the art. As shown in FIG. 4, the edge 52 of the first panel 53 overlaps the edge 54 of the second panel 53 to form a substantially flat seam 50.

The overlapping seam 50 is formed in one embodiment by overlapping edges 52 and 54 to form the overlapping region 58. The panels 53 and 55 are bonded together along at least a portion of the overlapping region 58. As shown in FIG. 4, the panels 53 and 55 may be fused directly together. In one embodiment, for example, one or more of the panels 53 and 55 may comprise a synthetic material (i.e., formed by chemical synthesis) that may be at least partially melted to fuse the panels 53 and 55 directly together. A heat/pressure process, such as RF bonding for example, may be used to fuse the panels 53 and 55 directly together in the overlapping region 58 by at least partially melting the panel materials in the overlapping region and applying pressure until the panel materials fuse together to form the overlapping seam 50. Alternatively, any other known bonding process may be used to form the overlapping seam 50.

Figure 5:
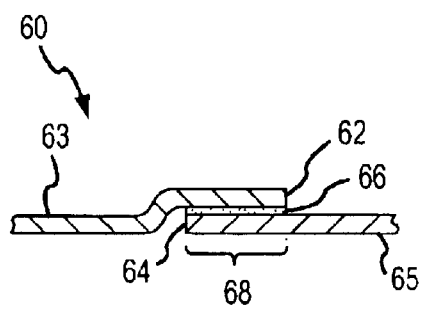
FIG. 5 shows a cross-sectional view taken along section line 5—5 of FIG. 1 and showing a second embodiment of an overlapping seam.

FIG. 5 shows a cross-section of a second embodiment of an overlapping seam 60. As in the embodiment shown in FIG. 4, the overlapping seam 60 comprises an edge 62 of a first panel 63 overlapping an edge 64 of a second panel 65 to form an overlapping region 68. In this embodiment, the panels 63 and 65 are bonded together in at least a portion of the overlapping region 68 via a bonding agent 66 to form the overlapping seam 60. Any suitable bonding agent such as an adhesive or heat-meltable plastic may be used. In one embodiment, for example, thermoplastic polyurethane adhesive is used. As shown in FIG. 5, the edge 62 of the first panel 63 overlaps the edge 64 of the second panel 65 to form a substantially flat seam 60.

The seam 60 may, for example, be formed by placing a thin layer of a bonding agent 66 intermediate panels 63 and 65 in at least a portion of the overlapping region 68. The bonding agent 66 may, for example, be placed in a continuous layer throughout the overlapping region 68 or be placed in discrete regions, such as lines, dots, swirls or other patterns in an amount sufficient to bond panels 63 and 65. The overlapping region 68 is placed in a heat press and the bonding agent 66 melts and binds the edges 62 and 64 as a thin weld line to form the overlapping seam 60. Alternatively, any other known bonding process may be used to form the overlapping seam 60.

Figure 6:
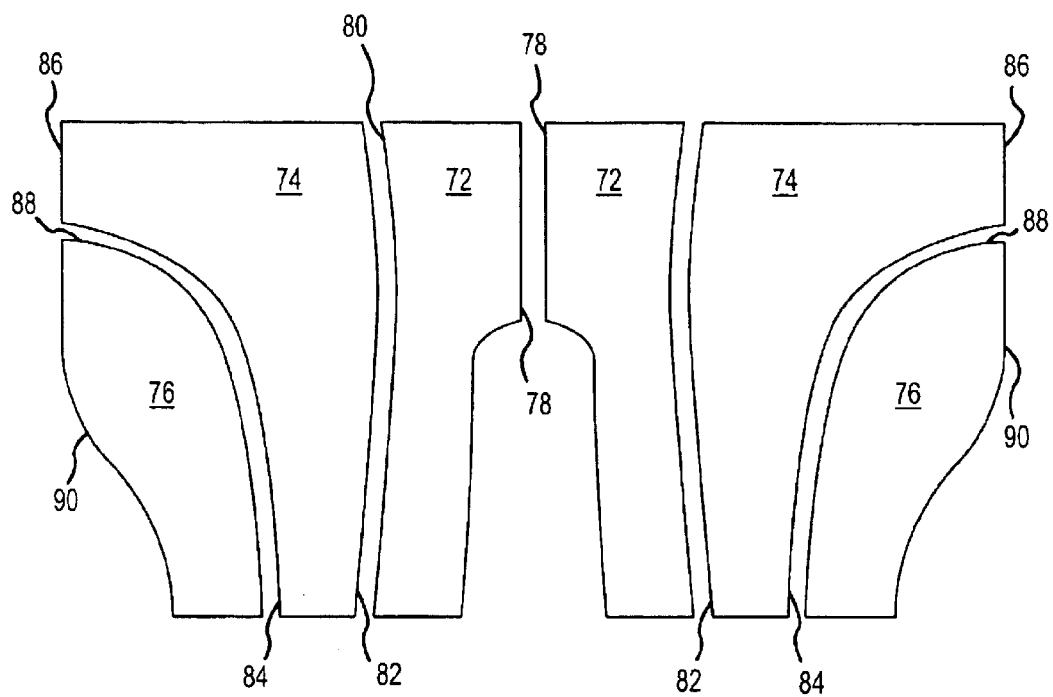
FIG. 6 shows a plan view of a plurality of panels for forming a pair of cycling shorts in a pre-assembled configuration.

FIG. 6 shows a plan view of a plurality of panels 70 for forming an exemplary embodiment of a pair of cycling shorts in a pre-assembled configuration. The cycling shorts comprise a pair of front panels 72, a pair of mid-panels 74 and a pair of rear panels 76. The front panels 72 each comprise side edges 78 and 80. The front panels are attached to each other at edges 78. The mid-panels 74 each comprise three side edges 82, 84 and 86. As can be seen in FIG. 6, the mid-panels 74 are attached to the front panels 72 along side edges 80 and 82. The mid-panels 74 are also attached to each other along side edges 86 and are attached to the rear panels 76 along edges 84 and 86. The rear panels 76 each comprise side edges 88 and 90. The rear panels 76 are each connected to the mid-panels 74 along side edges 88 of the rear panels 76 and side edges 84 of the mid-panels 74. The rear panels 76 are also attached to each other along side edges 90 at the rear of the cycling shorts.

Each of the panels comprises at least one edge along which it is to be connected to one or more adjacent panels. The edges may comprise straight edges (e.g., edge 78 of front panel 72) or curved edges (e.g., edge 80 of front panel 72). When the edges are straight, a straight seam is preferably formed, and when the edges 72 are curved, a curved seam is preferably formed.

In the embodiment shown in FIG. 6, for example, the curved edges, such as edges 80, allow for curved seams to be formed. The curved edges of the panels can be defined by a minimum radius of curvature of the edge. The shorter the minimum radius of curvature of the edge, the sharper of a curved seam will result. In one embodiment, for example, it has been found that for cycling shorts comprising panels made of a polyester and spandex blend material, a minimum radius of curvature of approximately 4 cm provided a substantially flat seam after the cycling pants were assembled. If a curve is too sharp, i.e., the minimum radius of curvature for a particular material is too low, however, the material may tend to bunch, wrinkle or fold near the seam. Thus, by adjusting the minimum radius of curvature for a particular curved seam and material, a substantially flat overlapping seam can be achieved.

The stretchable athletic pants of the present invention comprise one or more panels attached together by one or more seams to form the pants in which at least one of the seams comprises an overlapping bonded seam. The stretchable athletic pants 10, for example, may comprise one or more overlapping bonded seams and one or more other type of seam, such as a stitched seam. In one embodiment in which the pants comprise a pair of cycling shorts, for example, a plurality of overlapping bonded seams are formed around the perimeter of the shorts until only one seam remains to form the shorts (e.g., a seam connecting edges 86 of mid panels 74 and edges 90 of rear panels 76 to each other, respectively, as shown in FIG. 6). In this embodiment, the final seam may be stitched or otherwise connected to complete the manufacture of the shorts.

While the invention has been particularly shown and described with reference to a preferred embodiment thereof, it will be understood by those skilled in the art that various other changes in the form and details may be made without departing from the spirit and scope of the invention.

What is claimed is:

1. A pair of stretchable athletic pants comprising:
   a body portion comprising:
      a panel of a stretchable material comprising a first edge, said first edge being sealed,
      a second edge overlapping said first edge of the panel forming an overlapping region, said panel being bonded in at least a portion of said overlapping region via an overlapping bonded seam, said second edge being sealed,
   wherein said body portion further defines a crotch and buttocks region, a waist opening and two leg openings such that a user can insert a leg through each of said leg openings and pull said body portion upward into a wearing position.

2. The stretchable athletic pants of claim 1, wherein said overlapping bonded seam comprises a substantially flat seam.

3. The stretchable athletic pants of claim 1, wherein said overlapping bonded seam comprises a curved seam.

4. The stretchable athletic pants of claim 3, wherein said overlapping bonded seam comprises a curved seam comprising a minimum radius of curvature of at least about 4 centimeters.

5. The stretchable athletic pants of claim 1, wherein said overlapping bonded seam comprises a straight seam.

6. The stretchable athletic pants of claim 1, wherein said overlapping bonded seam comprises a bonding agent disposed in at least a portion of said overlapping region.

7. The stretchable athletic pants of claim 1, wherein said overlapping bonded seam comprises said panel being directly bonded in at least a portion of said overlapping region.

8. The stretchable athletic pants of claim 1, wherein said panel of stretchable material comprises an elastic material.

9. The stretchable athletic pants of claim 1, wherein said panel of stretchable material comprises a moisture wicking material.

10. The stretchable athletic pants of claim 1, wherein said panel of stretchable material comprises a multi-layered denier gradient structure.

11. The stretchable athletic pants of claim 1, wherein the pants comprise pants selected from one or more of the group comprising: a pair of athletic shorts, a pair of cycling shorts, a pair of athletic pants, a pair of cycling pants, a bib, a cycling bib, a pair of tights, a pair of briefs.

12. The stretchable athletic pants of claim 1, further comprising a chamois disposed adjacent at least a portion of said panel of stretchable material.

13. The stretchable athletic pants of claim 12, wherein said chamois is disposed in said crotch and buttocks region of said body portion.

14. The stretchable athletic pants of claim 1, wherein said second edge comprises a second edge of said panel.

15. The stretchable athletic pants of claim 1, wherein said second edge comprises an edge of a second panel.

16. The stretchable athletic pants of claim 1, wherein the pants are designed to be worn as a base layer.

17. The stretchable athletic pants of claim 1, wherein said panel comprises a nylon and spandex blend.

18. The stretchable athletic pants of claim 17, wherein said panel further comprises a nylon, polyester and spandex blend.

19. The stretchable athletic pants of claim 1, wherein said seam comprises a structural seam.

20. A pair of cycling pants comprising:
   a body portion comprising a first panel of an elastic material and a second panel of an elastic material attached along a seam, said body portion further comprising a crotch and buttocks region, a waist opening and two leg openings such that a user can insert a leg through each of said leg openings and pull said body portion upward into a wearing position,
   wherein said seam comprises a sealed edge of the first panel and a sealed edge of the second panel arranged in an overlapping bonded seam.

21. The cycling pants of claim 20, wherein said overlapping bonded seam comprises a substantially flat seam.

22. The cycling pants of claim 20, wherein said overlapping bonded seam comprises a curved seam.

23. The cycling pants of claim 22, wherein said overlapping bonded seam comprises a curved seam comprising a minimum radius of curvature of at least about 4 centimeters.

24. The cycling pants of claim 20, wherein said overlapping bonded seam comprises a straight seam.

25. The cycling pants of claim 20, wherein said overlapping bonded seam comprises a bonding agent disposed in at least a portion of an overlapping region of said first panel and said second panel.

26. The cycling pants of claim 20, wherein said overlapping bonded seam comprises said first panel and said second panel directly bonded in at least a portion of an overlapping region of said first panel and said second panel.

27. The cycling pants of claim 20 further comprising a chamois disposed in said crotch and buttocks region of said body portion.

28. A method of making stretchable athletic pants comprising:
   providing a panel of a stretchable material having a first edge;
   sealing the first edge;
   providing a second edge;
   sealing the second edge;
   overlapping said first edge and said second edge to form an overlapping region;
   bonding said panel in at least a portion of said overlapping region to provide an overlapping bonded seam; and
   forming a body portion of a pair of stretchable athletic pants comprising said panel, said body portion comprising a crotch and buttocks region, a waist opening and two leg openings such that a user can insert a leg through each of said leg openings and pull said body portion upward into a wearing position.

29. The method of claim 28, wherein said overlapping bonded seam comprises a substantially flat seam.

30. The method of claim 28, wherein said bonding operation comprises directly bonding said panel in said overlapping region.

31. The method of claim 28, wherein said bonding operation comprises bonding said panel in said overlapping region using a bonding agent.

32. The method of claim 31, wherein said bonding agent comprises a thermoplastic polyurethane adhesive.

33. The method of claim 28, wherein said overlapping bonded seam comprises a straight seam.

34. The method of claim 28, wherein said overlapping bonded seam comprises a curved seam.

35. The method of claim 34, wherein said curved seam comprises a minimum radius of curvature of at least about 4 centimeters.

36. The method of claim 28, further comprising disposing a chamois in said crotch and buttocks region of said body portion.

37. The method of claim 28, wherein said first panel of stretchable material comprises an elastic material.

38. The method of claim 28, wherein said second edge of the pants comprises a second edge of said panel.

39. The method of claim 28, wherein said second edge of the pants comprises an edge of a second panel.

40. The stretchable athletic pants of claim 1, wherein the first edge is sealed by a laser while cutting the panel.

41. The cycling pants of claim 20, wherein the sealed edge of the first panel and the sealed edge of the second panel are sealed using a laser.

42. The method of claim 28, wherein the step of sealing the first edge comprising the step of cutting the panel with a laser and the step of sealing the second edge comprises the step of cutting the panel with the laser.

* * * * *